(12) United States Patent
Schmidt et al.

(10) Patent No.: US 9,431,932 B2
(45) Date of Patent: Aug. 30, 2016

(54) CONVERTER UNIT FOR AN ASYNCHRONOUS MACHINE

(75) Inventors: Ralph Schmidt, Weinstadt (DE); Joachim Fetzer, Bad-Ditzenbach (DE); Stefan Butzmann, Beilstein (DE); Holger Fink, Stuttgart (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 138 days.

(21) Appl. No.: 14/352,078

(22) PCT Filed: Sep. 12, 2012

(86) PCT No.: PCT/EP2012/067790
§ 371 (c)(1),
(2), (4) Date: Aug. 6, 2014

(87) PCT Pub. No.: WO2013/056900
PCT Pub. Date: Apr. 25, 2013

(65) Prior Publication Data
US 2014/0368132 A1    Dec. 18, 2014

(30) Foreign Application Priority Data
Oct. 18, 2011   (DE) .................. 10 2011 084 698

(51) Int. Cl.
| H02P 1/00 | (2006.01) |
| --- | --- |
| H02P 3/00 | (2006.01) |
| H02P 5/00 | (2016.01) |
| H02P 6/00 | (2016.01) |
| B60L 11/18 | (2006.01) |
| H02M 7/49 | (2007.01) |
| H02M 7/487 | (2007.01) |
| H02M 7/483 | (2007.01) |
| H02J 7/00 | (2006.01) |

(52) U.S. Cl.
CPC ............... *H02P 6/002* (2013.01); *B60L 11/18* (2013.01); *B60L 11/1864* (2013.01); *H02M 7/487* (2013.01); *H02M 7/49* (2013.01); *H02J 2007/0067* (2013.01); *H02M 2007/4835* (2013.01); *Y02T 10/7005* (2013.01); *Y02T 10/7061* (2013.01)

(58) Field of Classification Search
CPC .......................... B60L 11/1866; H02J 7/0054
USPC ....................................................... 318/139
See application file for complete search history.

(56) References Cited

U.S. PATENT DOCUMENTS

| 5,642,275 A | 6/1997 | Peng et al. |
| --- | --- | --- |
| 2011/0198936 A1 | 8/2011 | Graovac et al. |

FOREIGN PATENT DOCUMENTS

| DE | 10 2011 004 248 A1 | 8/2011 |
| --- | --- | --- |
| WO | 2010/078999 A1 | 7/2010 |
| WO | 2010/097122 A1 | 9/2010 |
| WO | 2012/152586 A2 | 11/2012 |

OTHER PUBLICATIONS

International Search Report corresponding to PCT Application No. PCT/EP2012/067790, mailed Jan. 3, 2014 (German and English language document) (5 pages).

*Primary Examiner* — Erick Glass
(74) *Attorney, Agent, or Firm* — Maginot, Moore & Beck LLP

(57) ABSTRACT

A converter unit having at least one output. The at least one output is configured to be connected to a coil of an asynchronous machine. The converter unit is configured to provide several voltage levels at the at least one output.

7 Claims, 12 Drawing Sheets

CONVERTER UNIT FOR AN ASYNCHRONOUS MACHINE

This application is a 35 U.S.C. §371 National Stage Application of PCT/EP2012/067790, filed on Sep. 12, 2012, which claims the benefit of priority to Serial No. DE 10 2011 084 698.0, filed on Oct. 18, 2011 in Germany, the disclosures of which are incorporated herein by reference in their entirety.

The present disclosure relates to a converter unit for an asynchronous machine and to a battery and a drive unit, which comprise the converter unit according to the disclosure.

BACKGROUND

It appears that in future battery systems will be used increasingly both in stationary applications and in vehicles such as hybrid and electric vehicles. In order to be able to meet the requirements placed on voltage and available power as set for a respective application, a high number of battery cells are connected in series. Since the current provided by such a battery needs to flow through all of the battery cells and a battery cell can only conduct a limited current, often battery cells are additionally connected in parallel in order to increase the maximum current. This can take place either by virtue of the provision of a plurality of cell coils within a battery cell housing or by externally interconnecting battery cells. However, it is problematic here that, owing to imprecisely identical cell capacitances and voltages, compensation currents can arise between the battery cells connected in parallel.

The basic circuit diagram of a conventional electrical drive unit, such as is used, for example, in electric and hybrid vehicles or else in stationary applications such as in the case of the rotor blade adjustment of wind turbines, is illustrated in FIG. 1. A battery 10 is connected to a DC voltage intermediate circuit, which is buffered by an intermediate circuit capacitor 11. A pulse-controlled inverter 12 is connected to the DC voltage intermediate circuit and provides, via in each case two switchable semiconductor valves and two diodes, sinusoidal currents which are phase-shifted with respect to one another at three taps 14-1, 14-2, 14-3 for the operation of an electric drive motor 13. The capacitance of the intermediate circuit capacitor 11 needs to be sufficiently high for the voltage in the DC voltage intermediate circuit to be stabilized for a period in which one of the switchable semiconductor valves is on. In a practical application such as an electric vehicle, a high capacitance in the mF range results.

If, in the case of the arrangement illustrated in FIG. 1, an asynchronous machine is used as the electric drive motor 13, it is disadvantageous that the achievable power is limited by the eddy current losses in the rotor of the asynchronous machine at high speeds. These losses are caused by the severe harmonics in the current which are caused by the high potential differences of the pulse-controlled inverter 12 and the resultant high values for the change in current over time. In order to reduce these losses, it is nowadays conventional to connect a filter 15 between the pulse-controlled inverter 12 and the asynchronous machine 13, as is illustrated in FIG. 2. By means of this filter 15, the harmonics in the current are reduced, with the result that the losses are reduced and operation at a high speed is expediently possible for the first time. However, the filter 15 increases the complexity of a required controlled system considerably, takes up installation space and also represents a considerable cost factor.

SUMMARY

According to the disclosure, a converter unit comprising at least one output is provided. The output of the converter unit is connectable to a coil of an asynchronous machine, and the converter unit is designed to provide a plurality of voltage levels at its output. This makes it possible to operate an asynchronous machine rotating at a high speed without interposing a filter, as is illustrated in FIG. 2, without notable eddy current losses arising in the asynchronous machine. Thus, operation of the asynchronous machine at high speeds and high powers becomes possible. Since an asynchronous machine is substantially more favorable in terms of costs in comparison with a synchronous machine and an additional filter can be dispensed with owing to the use of the converter unit according to the disclosure, overall the possibility is provided of providing an inexpensive electric drive unit.

It is preferred that the converter unit is designed to provide a substantially sinusoidal voltage signal of a predetermined frequency at its output. Since the voltage at the output of the converter unit can be set in a stepped fashion, a sinusoidal profile can only be achieved at an approximation. In the context of the disclosure, however, it is sufficient to provide a voltage signal which, owing to the use of a sufficiently high number of voltage levels, is brought so close to an ideal sinusoidal profile that the mode of operation of the asynchronous machine is not impaired and the changes in the current in the coil of the asynchronous machine over time are not excessively high.

Typically, the converter unit comprises three outputs, which are connectable to the three coils conventionally used in a stator of the asynchronous machine.

In a preferred embodiment of the disclosure, provision is made for the converter unit to comprise at least one battery module string comprising a plurality of battery modules connected in series. Each battery module comprises at least one battery cell, at least one coupling unit, a first connection and a second connection. Each of the battery modules is designed to assume one of at least two switching states depending on an actuation of the coupling unit. In this case, various switching states correspond to different voltage values between the first connection and the second connection of the battery module, i.e. various voltages can be tapped off between the first connection and the second connection.

Various embodiments of the coupling unit can advantageously be used. In a first embodiment, the coupling unit is designed to connect the at least one battery cell between the first connection and the second connection in the case of a first control signal and to connect the first connection and the second connection in the case of a second control signal.

In a further embodiment, the battery module is designed to optionally assume one of at least three switching states depending on an actuation of the coupling unit. In a first switching state, the first connection and the second connection of the battery module are connected. In a second switching state, the at least one battery cell is connected between the first connection and the second connection with a first (for example positive) polarity. In a third switching state, the at least one battery cell is connected between the first connection and the second connection with a polarity which is opposite the first polarity (in the same example negative).

The various embodiments of the battery modules or coupling units can also be mixed within a battery module string.

In a further embodiment of the disclosure, the converter unit comprises a multilevel inverter having at least one output. The output of the multilevel inverter forms the output of the converter unit.

The two above-described embodiments of the converter unit can also be combined to the extent that the converter unit comprises a battery module string comprising the above-described battery modules and a plurality of center taps are arranged on the battery module string. A potential can be tapped off at a connection between in each case two battery modules at the center taps. The inputs of the multilevel inverter are connected to the center taps.

A further aspect of the disclosure relates to a battery, preferably a lithium-ion battery, comprising at least one converter unit according to the disclosure. A further aspect of the disclosure relates to a drive unit comprising at least one asynchronous machine and at least one converter unit according to the disclosure or else a battery comprising the converter unit according to the disclosure. The output of the converter unit is in this case connected to a coil of the asynchronous machine.

A further aspect of the disclosure relates to a motor vehicle comprising the drive unit according to the disclosure.

Overall, by virtue of the converter unit according to the disclosure, an arrangement is provided in which the difference between a setpoint voltage and a voltage which can actually be tapped off at the output of the converter unit is less than in the case of a converter unit in accordance with the prior art.

BRIEF DESCRIPTION OF THE DRAWINGS

Exemplary embodiments of the disclosure will be explained in more detail with reference to the drawings and the description below, wherein identical reference symbols denote identical or functionally identical components. In the drawings.

DETAILED DESCRIPTION

Figure 1:
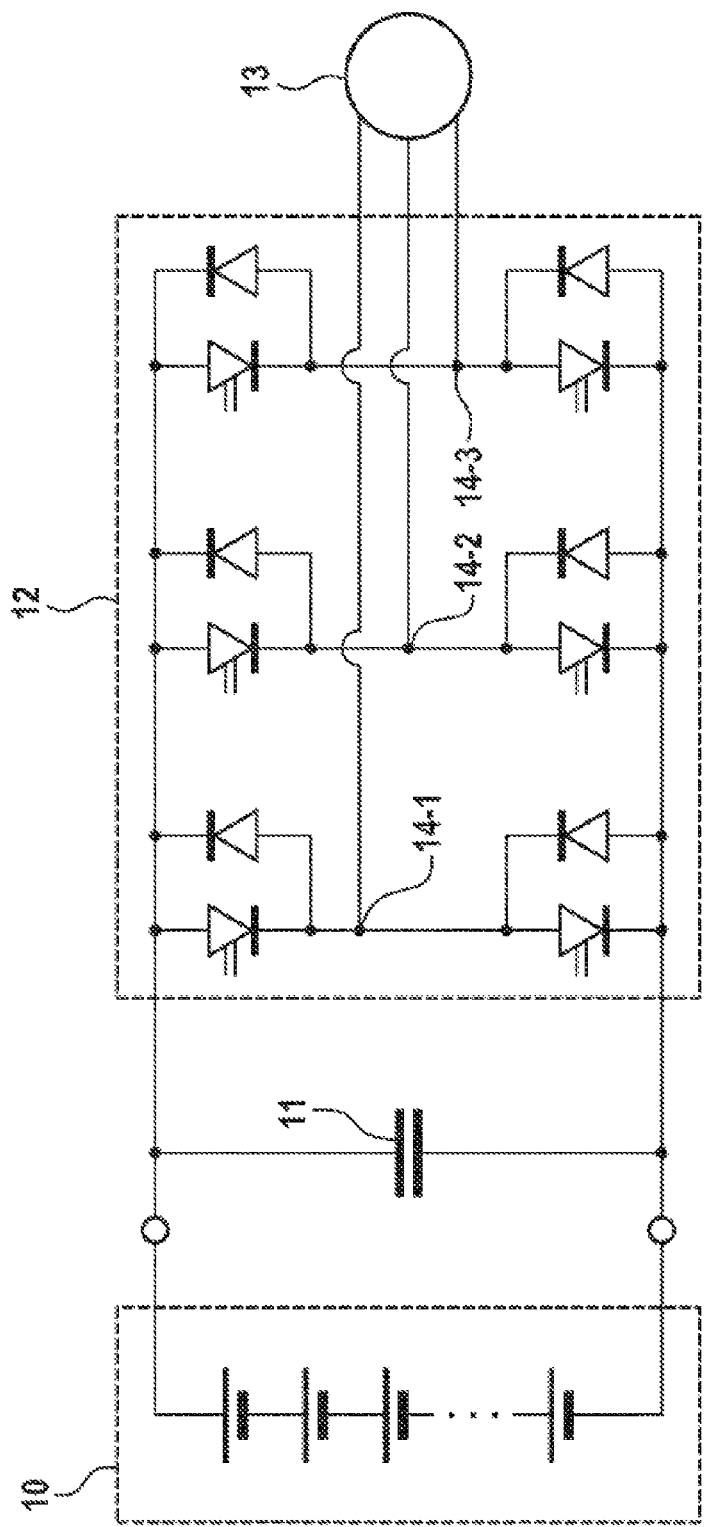
FIGS. 1 and 2 each show an electric drive unit in accordance with the prior art.
Figure 2:
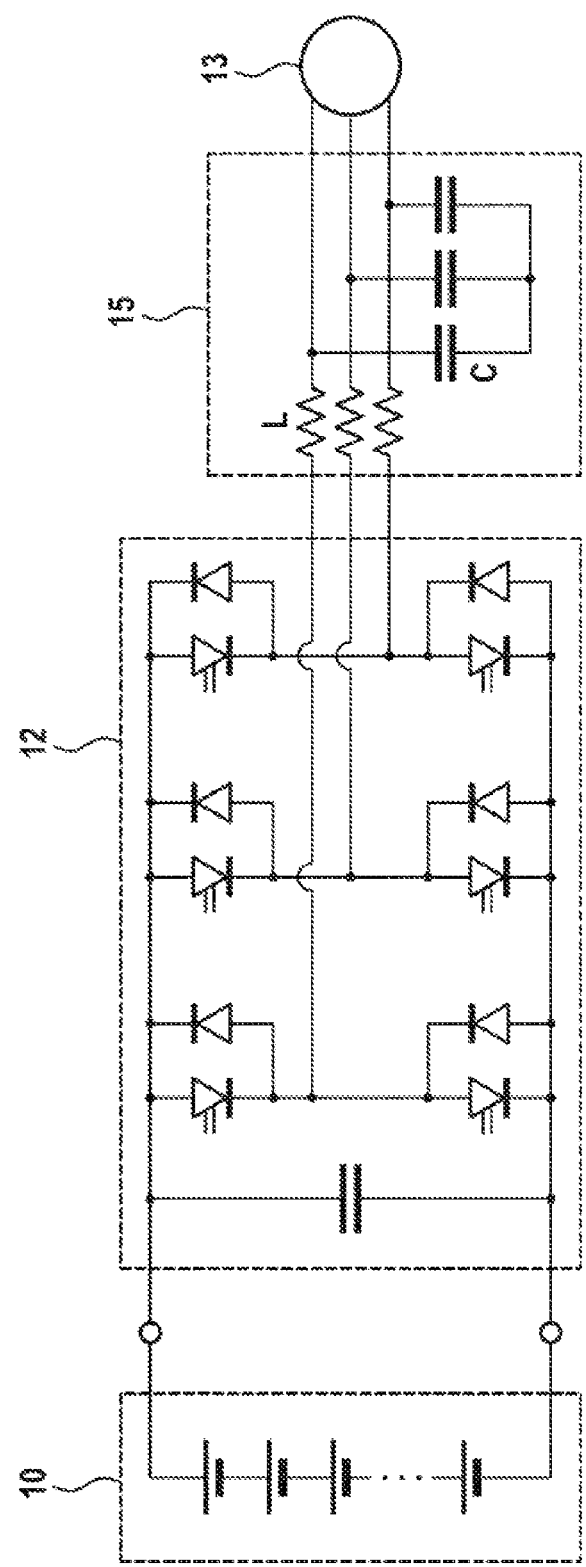
Figure 3:
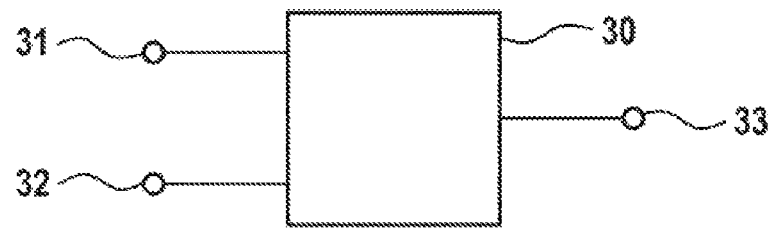
FIG. 3 shows a coupling unit which can be used in the converter unit according to the disclosure.

FIG. 3 shows a coupling unit 30, which can be used in the converter unit 90 according to the disclosure. The coupling unit 30 has two inputs 31 and 32 and an output 33 and is designed to connect one of the inputs 31 or 32 to the output 33 and to decouple the other input. In specific embodiments of the coupling unit 30, said coupling unit can also be designed to isolate the two inputs 31, 32 from the output 33. However, no provision is made for both the input 31 and the input 32 to be connected to the output 33.

Figure 4:
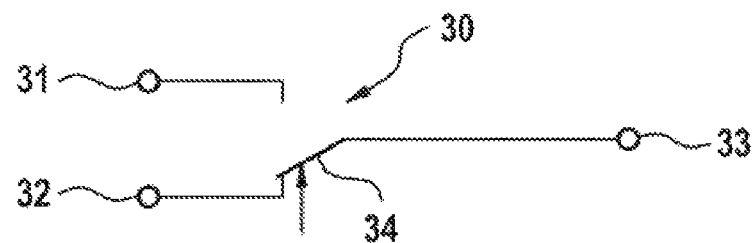
FIG. 4 shows a first embodiment of the coupling unit.

FIG. 4 shows a first embodiment of the coupling unit 30, which has an inverter 34, which in principle can only connect one of the two inputs 31, 32 to the output 33, while the respective other input 31, 32 is decoupled from the output 33. The inverter 34 can be embodied particularly simply as an electromechanical switch.

Figure 5:
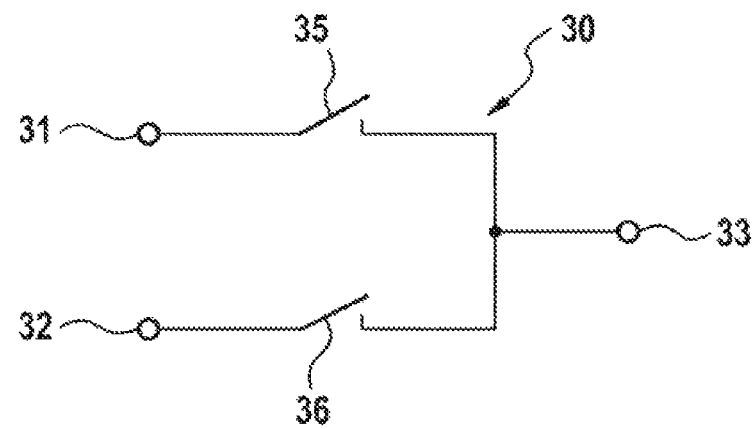
FIG. 5 shows a second embodiment of the coupling unit.

FIG. 5 shows a second embodiment of the coupling unit 30, in which a first and a second switch 35 and 36, respectively, are provided. Each of the switches 35, 36 is connected between one of the inputs 31 or 32 and the output 33. In contrast to the embodiment shown in FIG. 4, this embodiment has the advantage that both inputs 31, 32 can also be decoupled from the output 33, with the result that the output 33 is provided with a high resistance. In addition, the switches 35, 36 can be implemented simply as semiconductor switches, such as, for example, metal-oxide semiconductor field-effect transistor (MOSFET) switches or insulated-gate bipolar transistor (IGBT) switches. Semiconductor switches have the advantage of a favorable price and a high switching speed, with the result that the coupling unit 30 can respond to a control signal or a change in the control signal within a short time and high switchover rates can be achieved.

Figure 6:
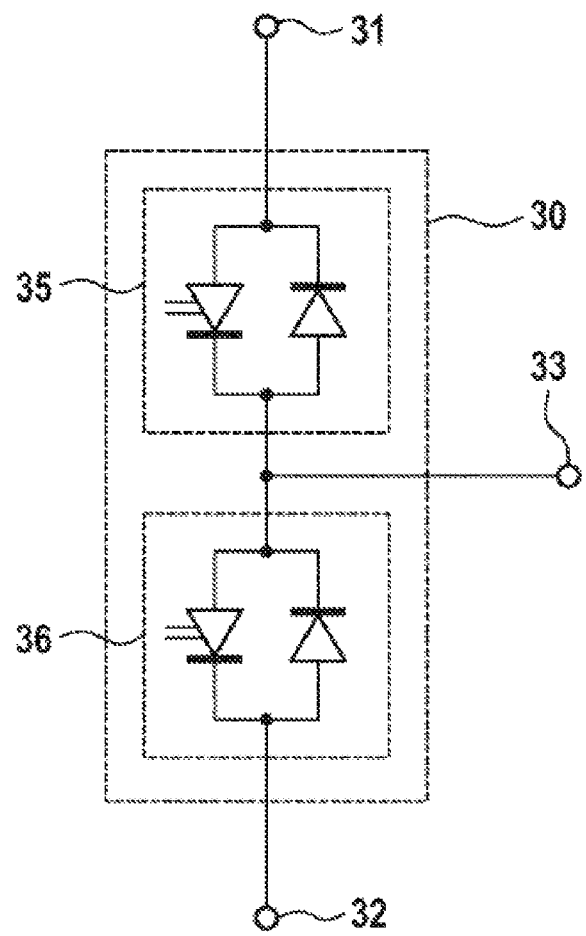
FIG. 6 shows the second embodiment of the coupling unit in a simple semiconductor circuit.

FIG. 6 shows the second embodiment of the coupling unit in a simple semiconductor circuit, in which each of the switches 35, 36 comprises in each case a semiconductor valve that can be switched on and off and a diode connected back-to-back in parallel with said semiconductor valve.

Figure 7:
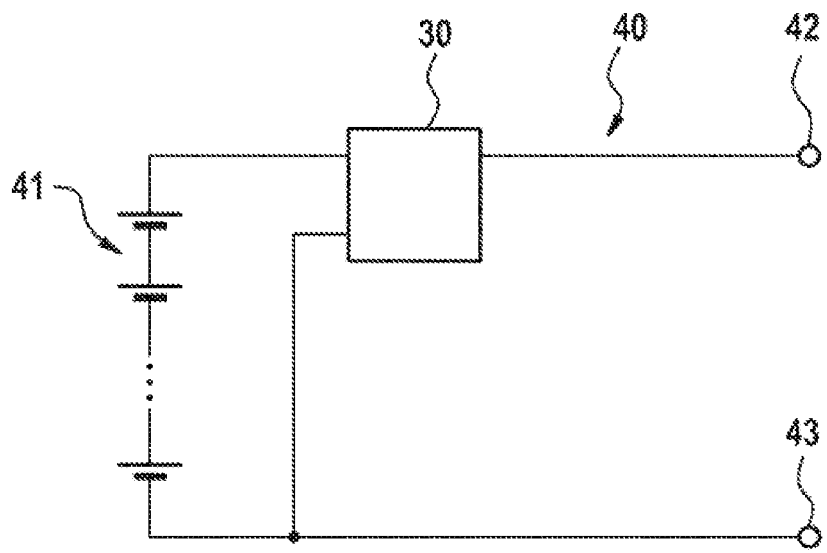
FIGS. 7 and 8 show two arrangements of the coupling unit in a battery module.
Figure 8:
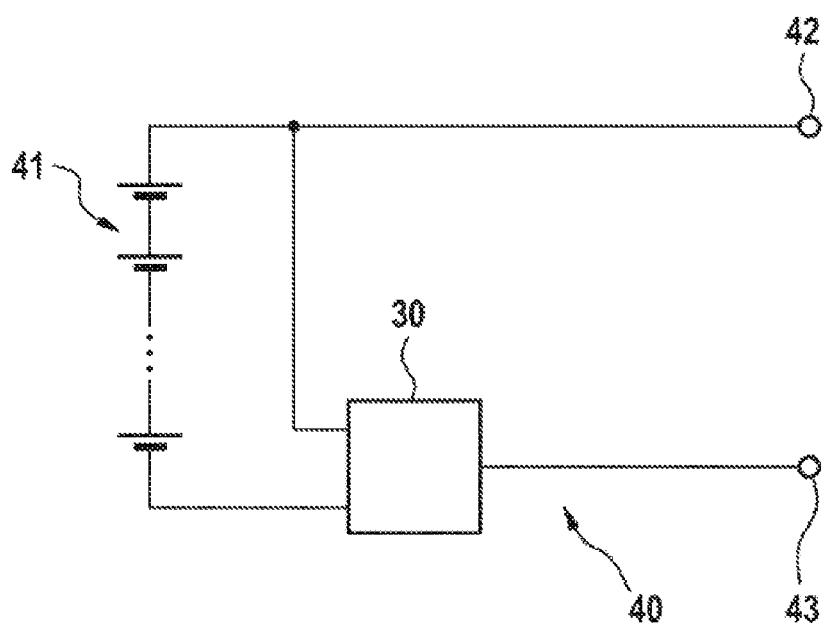

FIGS. 7 and 8 show two arrangements of the coupling unit 30 in a battery module 40. A plurality of battery cells 41 is connected in series between the inputs of a coupling unit 30. However, the disclosure is not restricted to such a series circuit comprising battery cells; it is also possible for only a single battery cell to be provided or else for a parallel circuit or mixed series and parallel circuit of battery cells to be provided. In the example shown in FIG. 7, the output of the coupling unit 30 is connected to a first connection 42 and the negative pole of the battery cells 41 is connected to a second connection 43. However, a mirror-image arrangement as shown in FIG. 8 is possible, in which the positive pole of the battery cells 41 is connected to the first connection 42 and the output of the coupling unit 30 is connected to the second connection 43.

Figure 9:
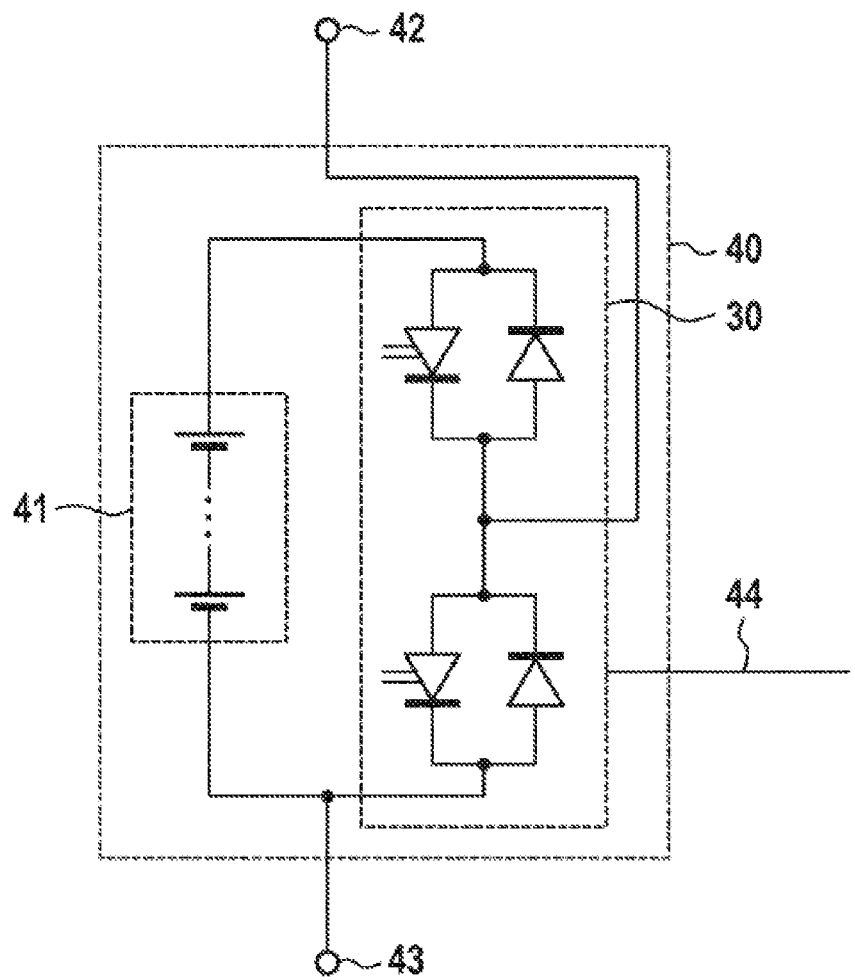
FIG. 9 shows the coupling unit illustrated in FIG. 6 in the arrangement illustrated in FIG. 7.

FIG. 9 shows the coupling unit 30 illustrated in FIG. 6 in the arrangement illustrated in FIG. 7. Actuation and diagnosis of the coupling units 30 is performed via a signal line 44, which is connected to a control device (not illustrated). Overall, it is possible to set either 0 volt or a voltage $U_{mod}$ between the connections 42 and 43 of the battery module 40.

Figure 10:
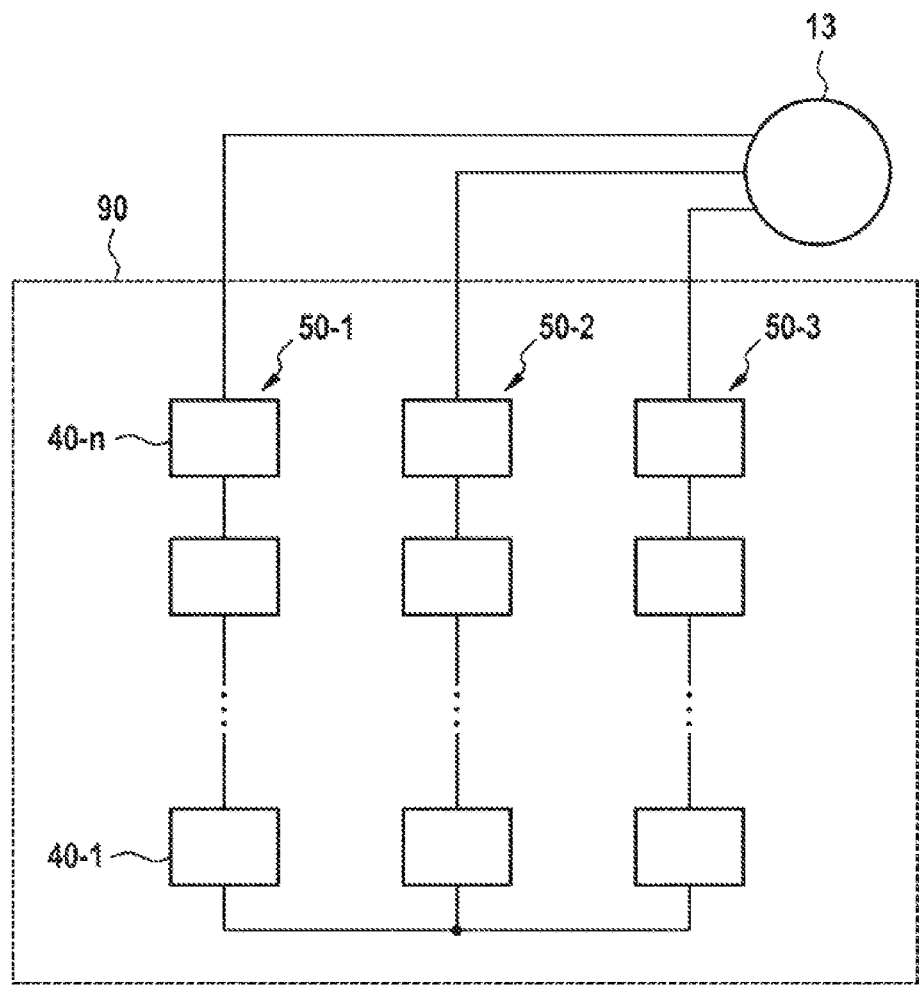
FIG. 10 shows an electric drive unit comprising a converter unit in accordance with a first embodiment of the disclosure.

FIG. 10 shows an electric drive unit comprising an asynchronous motor or an asynchronous machine 13 and comprising a converter unit 90 in accordance with a first embodiment of the disclosure.

Three coils are arranged in a stator of the asynchronous machine 13 in such a way that, on corresponding actuation, a rotating magnetic field is formed. A rotor of the asynchronous machine 13 comprises individual conductors, which run parallel to the axis of rotation and are either short-circuited with one another at their ends or else discharge the current occurring via slip rings.

During operation, the rotating magnetic field produced in the coils of the stator induces a voltage in the lines of the rotor which results in a current flow. From the interaction of the current flow with the magnetic field, the torque is formed, with the result that the rotor rotates.

In contrast to the case of a synchronous machine, the rotor in an asynchronous machine can in principle not reach the speed of the field, but deviates from this.

The three coils of the asynchronous machine 13 shown in FIG. 10 are connected to ends of three battery module strings 50-1, 50-2, 50-3, which together form the converter unit 90 in accordance with the first embodiment of the disclosure. Each of the three battery module strings 50-1, 50-2, 50-3 comprises a plurality of battery modules 40-1, ..., 40-n which are connected in series, which each comprise a coupling unit 30 and are constructed as illustrated in FIG. 7 or 8. When battery modules 40-1, ..., 40-n are combined to form one of the battery module strings 50-1, 50-2, 50-3, in each case the first connection 42 of a battery module 40-1, ..., 40-n is connected to the second connection 43 of an adjacent battery module 40-1, ..., 40-n. In this way, a stepped output voltage can be produced in each of the three battery module strings 50-1, 50-2, 50-3.

Figure 11:
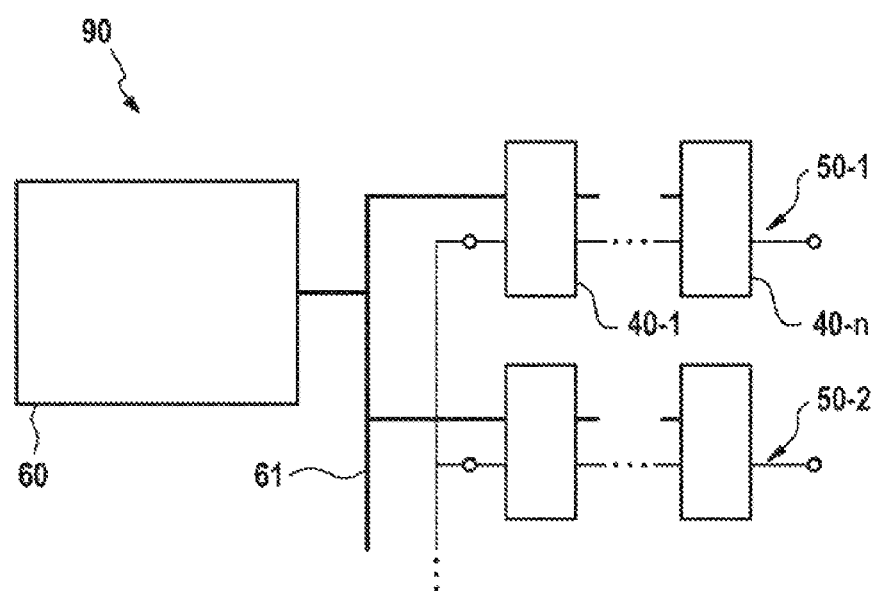
FIG. 11 shows an actuation of the converter unit shown in FIG. 10 by a control device.

A control device 60 shown in FIG. 11 is designed to output a first control signal to a variable number of battery modules 40-1, ..., 40-n in the three battery module strings 50-1, 50-2, 50-3 via a data bus 61, by means of which first control signal the coupling units 30 of the thus actuated battery modules 40-1, ..., 40-n connect the battery cell (or the battery cells) 41 between the first connection 42 and the second connection 43 of the respective battery module 40-1, ..., 40-n. At the same time, the control device 60 outputs a second control signal to the remaining battery modules 40-1, ..., 40-n, by means of which second control signal the coupling units 30 of these remaining battery modules 40-1, ..., 40-n connect the first connection 42 and the second connection 43 of the respective battery module 40-1, ..., 40-n, as a result of which the battery cells 41 thereof are bypassed.

By suitable actuation of the plurality of battery modules 40-1, ..., 40-n in the three battery module strings 50-1, 50-2, 50-3, three sinusoidal output voltages can thus be generated, between which there is a phase shift of 120°. As a result, sinusoidal currents with a phase shift of 120° flow in the coils of the stator of the asynchronous machine 13.

Provision is made in a further embodiment for the battery modules 40-1, ..., 40-n used in the three battery module strings 50-1, 50-2, 50-3 to be designed to switch their battery cells 41 between the first connection 42 and the second connection 43 in such a way that a polarity of the voltage present between the first connection 42 and the second connection 43 is selectable depending on an actuation of the coupling unit.

Figure 12:
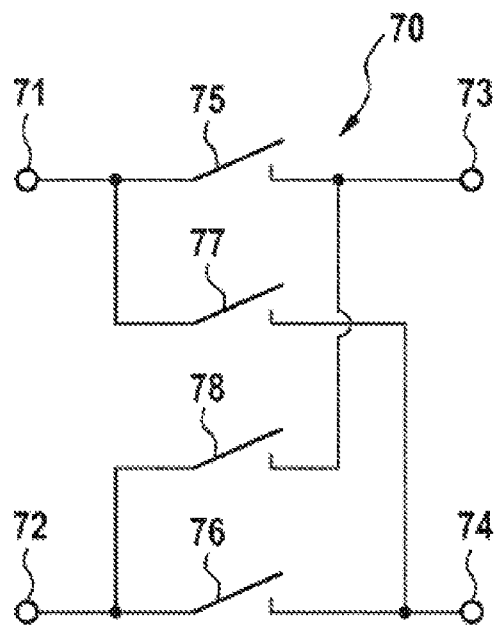
FIG. 12 shows an embodiment of the coupling unit which makes it possible for a voltage with a selectable polarity to be present between the connections of a battery module.

FIG. 12 shows an embodiment of a coupling unit 70 which makes this possible and in which a first, a second, a third and a fourth switch 75, 76, 77 and 78 are provided. The first switch 75 is connected between a first input 71 and a first output 73, the second switch 76 is connected between a second input 72 and a second output 74, the third switch 77 is connected between the first input 71 and the second output 74, and the fourth switch 78 is connected between the second input 72 and the first output 73.

Figure 13:
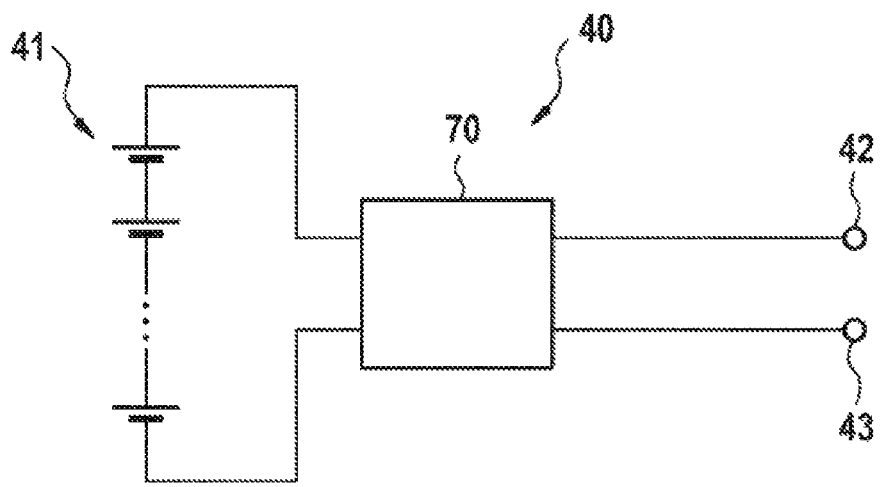
FIG. 13 shows an embodiment of the battery module comprising the coupling unit illustrated in FIG. 12.

FIG. 13 shows an embodiment of the battery module 40 with the coupling unit illustrated in FIG. 12. The first output of the coupling unit 70 is connected to the first connection 42 and the second output of the coupling unit 70 is connected to the second connection 43 of the battery module 40. The battery module 40 constructed in this way has the advantage that the battery cells 41 can be connected to the connections 42, 43 via the coupling unit with a selectable polarity, with the result that an output voltage with a different mathematical sign can be produced. It may also be possible, for example by closing of the switches 76 and 78 and simultaneous opening of the switches 75 and 77 (or else by opening of the switches 76 and 78 and closing of the switches 75 and 77), to connect the connections 42 and 43 conductively to one another and to generate an output voltage of 0 V. Overall, it is therefore possible to set either 0 volt, the voltage $U_{mod}$ or the voltage $-U_{mod}$ between the connections 42 and 43 of the battery module 40.

Figure 14:
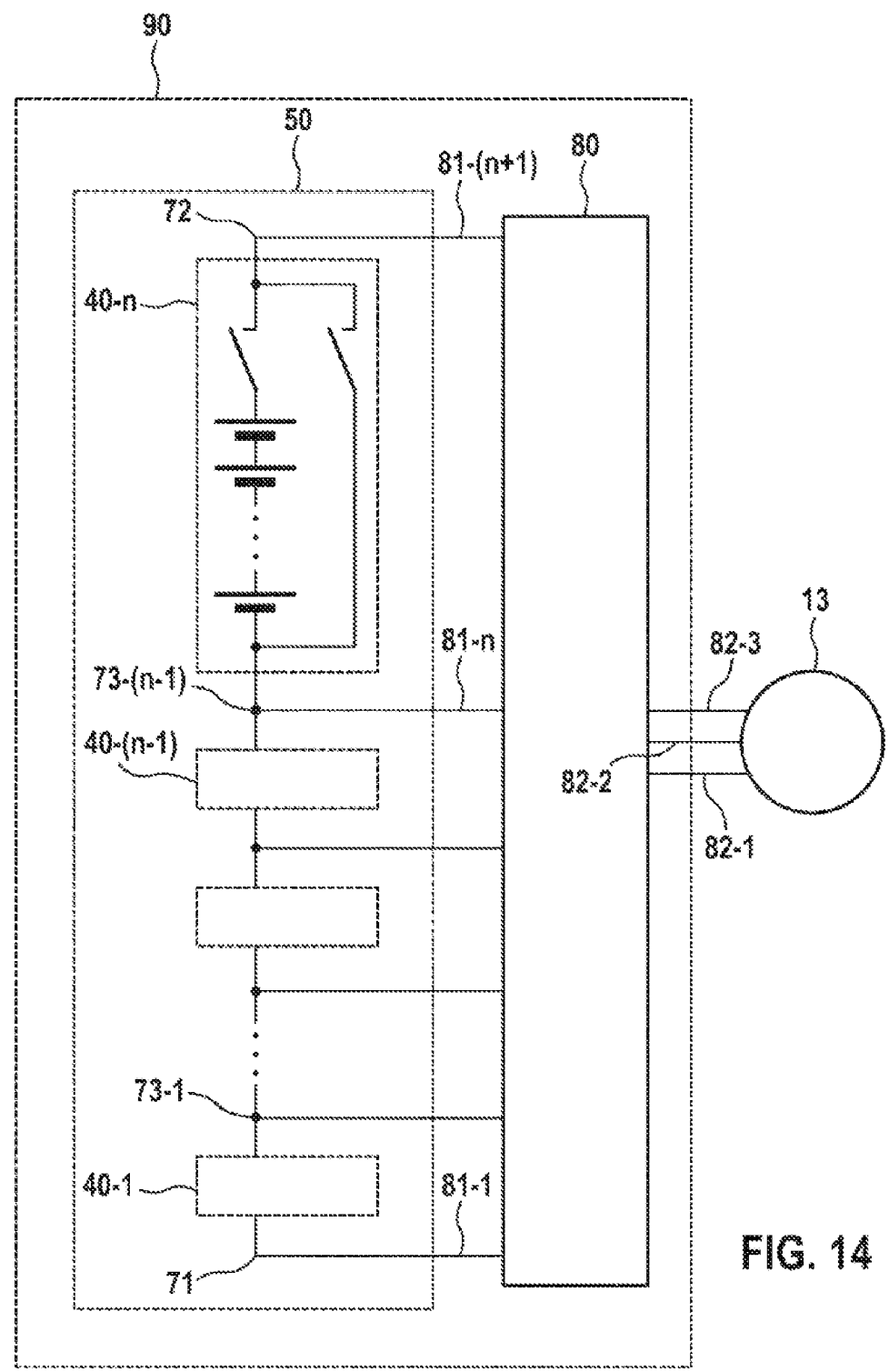
FIG. 14 shows an electric drive unit comprising a converter unit in accordance with a second embodiment of the disclosure.

FIG. 14 shows an electric drive unit comprising an asynchronous motor or an asynchronous machine 13 and comprising a converter unit 90 in accordance with a second embodiment of the disclosure, which comprises a multilevel inverter 80.

The multilevel inverter 80 has (n+1) inputs 81-1, ..., 81-(n+1) and three outputs 82-1, 82-2, 82-3 and is designed to output one of the potentials at each of its outputs 82-1, 82-2, 82-3, which potential in each case is present at one of its inputs 81-1, ..., 81-(n+1). The outputs 82-1, 82-2, 82-3 of the multilevel inverter 80 are connected to the coils of the asynchronous machine 13. Since most of the available electric motors are designed for operation with three phase signals, the multilevel inverter 80 preferably has precisely three outputs 82-1, 82-2, 82-3. The inputs 81-1, ..., 81-(n+1) of the multilevel inverter 80 are connected both to (n−1) center taps 73-1, ..., 73-(n−1) and to the poles 71, 72 of a battery module string 50, which, similar to as in the first exemplary embodiment, comprises n battery modules 40-1, ..., 40-n with coupling units. Owing to the fact that the potential at each of the outputs 82-1, 82-2, 82-3 of the multilevel inverter 80 is variable and is dependent on the potential values at its inputs 81-1, ..., 81-(n+1) and the potential values present at these inputs 81-1, ..., 81-(n+1) can in turn be set by suitable actuation of the n battery modules 40-1, ..., 40-n, there are a plurality of possible combinations for the actuation of the battery module string and the multilevel inverter 80, which generate an identical phase signal at the outputs 82-1, 82-2, 82-3 of the multilevel inverter 80, preferably an approximately sinusoidal AC voltage.

The phase signals at the outputs 82-1, 82-2, 82-3 of the multilevel inverter 80 can thus be set in stages. By setting a stepped profile of the potential at the outputs 82-1, 82-2, 82-3 of the multilevel inverter 80, the losses in the asynchronous machine 13 can be reduced since the conventional change between the positive and negative intermediate circuit potential is absent in the arrangement according to the disclosure. In this way, an improvement to the electromagnetic compatibility of the drive of the asynchronous machine 13 is achieved since the changes in the potential at the inputs of said drive are less pronounced. Likewise, an improvement to the efficiency of the power electronics in the arrangement according to the disclosure is achieved by virtue of the fact that switches comprising metal-oxide semiconductor field-effect transistors (MOSFETs) instead of insulated-gate bipolar transistors (IGBTs) can be used in the multilevel inverter 80.

Owing to the fact that a plurality of possible combinations for the actuation of the battery module string and the multilevel inverter 80 are provided for generating a predetermined phase signal at the outputs 82-1, 82-2, 82-3 of the multilevel inverter 80 and therefore also in the coils of the asynchronous machine 13, the actuation can be optimized to the extent that the battery modules 40 can be discharged uniformly and therefore, for example, no undesired reduction in the range of an electric vehicle results, which is caused by non-uniform utilization of the battery cells 41. This has the advantage that the advantages known from the prior art in respect of a multilevel inverter, in particular its high efficiency, can be used in electric drives without different discharge of the individual battery modules 40 needing to take place in a manner which is dependent on the load.

Figure 15:
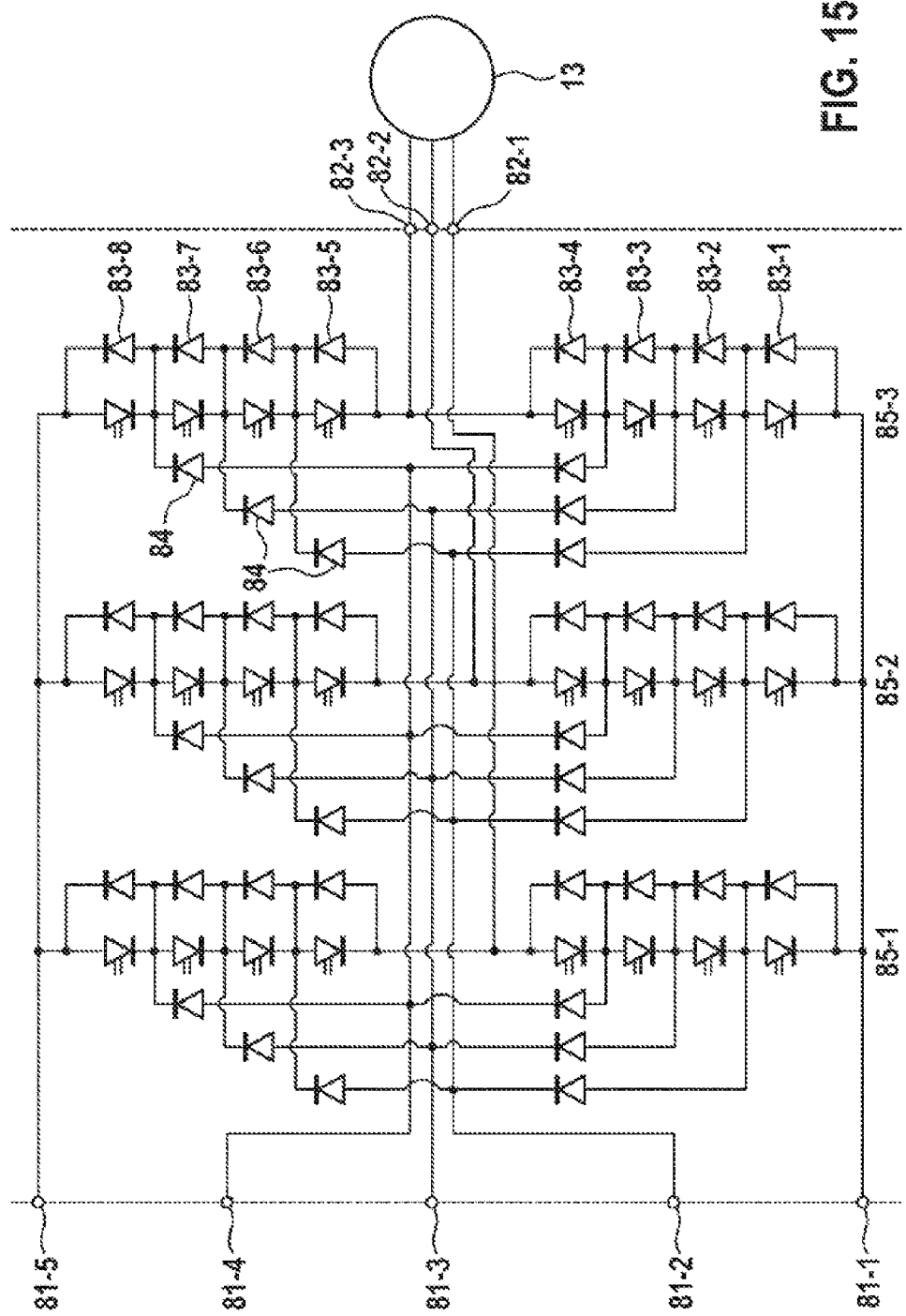
FIG. 15 shows an example of a four-stage multilevel inverter, which can be used in the converter unit in accordance with the second embodiment of the disclosure.

FIG. 15 shows an example of a four-stage multilevel inverter, which can be used in the converter unit 90 according to the disclosure and comprises five inputs 81-1, . . . , 81-5 and three outputs 82-1, 82-2, 82-3, wherein the latter are connected to the inputs of the asynchronous machine 13. The phase signals at the three outputs 82-1, 82-2, 82-3 are each controllable by switching elements, which are arranged in one of three strings 85-1, 85-2, 85-3 for each of the three outputs 82-1, 82-2, 82-3. The mode of operation of the multilevel inverter 80 illustrated in FIG. 15 is described by way of example below with reference to the string 85-3, which determines the phase signal at the output 82-3.

The string 85-3 comprises eight switching elements 83-1, . . . , 83-8, which each consist of a semiconductor valve which can be switched on and off and a diode which is connected in parallel therewith. The switching elements 83-1, . . . , 83-8 are divided into complementary pairs (83-1, 83-5), (83-2, 83-6), (83-3, 83-7), (83-4, 83-8). The actuation of each of the complementary pairs (83-1, 83-5), (83-2, 83-6), (83-3, 83-7), (83-4, 83-8) is performed in such a way that, when one of the switching elements is closed, the complementary switching element is opened. If the open state is illustrated by 0 and the closed state is illustrated by 1, a potential is thus output, as follows, at the output 82-3 of the multilevel inverter by a combination of the states of the switching elements 83-1, . . . , 83-8, which potential is equivalent to the potential at one of the inputs 81-1, . . . , 81-5 of the multilevel inverter 80:

potential at output 82-3=potential at input 81-1: 11110000;
potential at output 82-3=potential at input 81-2: 01111000;
potential at output 82-3=potential at input 81-3: 00111100;
potential at output 82-3=potential at input 81-4: 00011110;
potential at output 82-3=potential at input 81-5: 00001111.

If, for example, the switching combination 00011110 is selected, with the result that the potential at the output 82-3 is equivalent to the potential at the input 81-4, for the case where the inputs 81-1, . . . , 81-5 are connected to taps of the battery module string 50 between which in each case only one battery module 40 is arranged, a voltage can thus be generated, depending on the actuation of the battery modules 40, which voltage corresponds to a value between 0 V and the sum of three module voltages, wherein this voltage can be set in stages.

The multilevel inverter illustrated in FIG. 15 functions with voltage limitation via a network of diodes 84. These diodes are used for feeding the taps 71, 73-1, . . . , 73-(n−1), 72 of the battery module string 50 to the switching elements 83-1, . . . , 83-8 whilst at the same time preventing a short circuit of battery modules 40, which could take place in the event of a direct connection without diodes 84. The diodes 84 need to be dimensioned differently in respect of their blocking ability. The highest reverse voltage in the region of the switching elements 83-5, . . . , 83-8 needs to be assumed, for example, by that diode 84 which is connected between the input 81-2 and the switching element 83-5. There is a corresponding mirror-image response in the case of the diodes 84 in the region of the switching elements 83-1, . . . , 83-4.

One or more battery modules 40 each having a coupling unit 30 or 70 can be arranged between adjacent taps 71, 72, 73 of the battery module string 50 and therefore can each generate two or three potential values.

All of the embodiments of the converter unit 90 according to the disclosure have the common feature that a substantially sinusoidal voltage signal of a predetermined frequency is made available at the three outputs of the converter unit 90.

Figure 16:
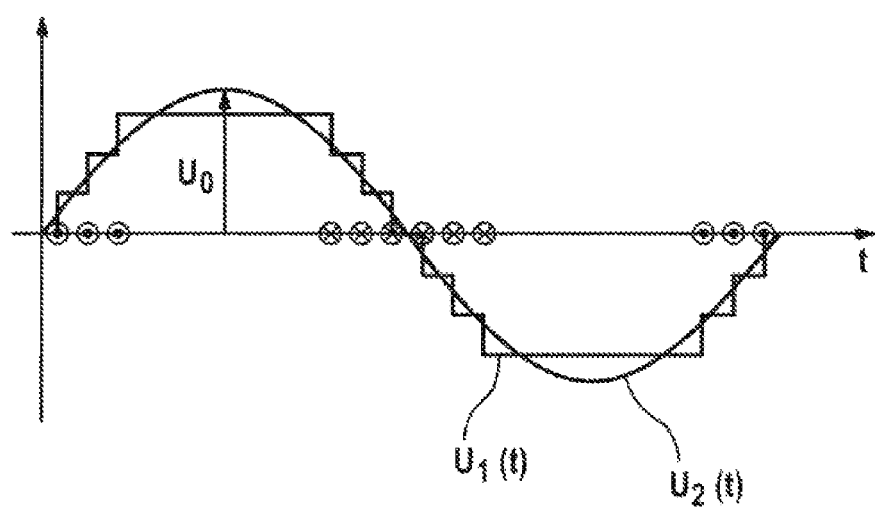
FIG. 16 shows a time profile of a voltage present at one of the outputs of the converter unit according to the disclosure.

FIG. 16 shows a time profile of a voltage $U_1(t)$ present at one of the three outputs of the converter unit 90 according to the disclosure. The voltage $U_1(t)$ assumes in each case constant values for specific time intervals and in this case approximately follows the sinusoidal profile of the setpoint voltage $U_2(t)$. The sinusoidal setpoint voltage profile $U_2(t)$ can have, for example, an amplitude $U_0$ of 20 V and a frequency of 50 Hz.

Those times are marked on the time axis in FIG. 16 at which a stepped increase or reduction in the voltage $U_1(t)$ takes place, for example as a result of battery modules being connected or bypassed in one of the battery module strings 50-1, 50-2, 50-3 in the first embodiment of the converter unit 90 according to the disclosure. If a higher number of battery modules is provided in one of the battery module strings 50-1, 50-2, 50-3, the profile $U_1(t)$ comes closer to the setpoint voltage profile of $U_2(t)$, and eddy current losses in the rotor of the asynchronous machine 13, which can be attributed to severe changes over time in the voltage profile $U_1(t)$, are reduced.

The invention claimed is:

1. A converter unit comprising:
   a plurality of battery modules connected in series, each battery module comprising:
      at least one battery cell;
      a first switch connected in series to the at least one battery cell to connect and disconnect the at least one battery cell from the plurality of battery cells; and
      a second switch connected in parallel to the at least one battery cell to bypass the at least one battery cell only in response to the first switch being configured to disconnect the at least one battery cell from the plurality of battery cells; and
   a multi-level inverter comprising:
      a plurality of inputs, each input being connected to at least one of the plurality of battery modules to connect the multi-level inverter in parallel with the plurality of battery modules;

at least one switching arrangement connected to each of the plurality of inputs, the at least one switching arrangement comprising:
  a first plurality of switching elements connected in series;
  a first plurality of input diodes, each input diode including an anode connected to one of the plurality of inputs and a cathode connected to an input of one of the first plurality of switching elements;
  a second plurality of switching elements connected in series;
  a second plurality of input diodes, each input diode including a cathode connected to one of the plurality of inputs and an anode connected to an input of one of the second plurality of switching elements;
  a third plurality of diodes, each diode in the third plurality of diodes being connected in parallel to one switching element in the first plurality of switching elements;
  a fourth plurality of diodes, each diode in the fourth plurality of diodes being connected in parallel to one switching element in the second plurality of switching elements; and
an output connected between the first plurality of switching elements and the second plurality of switching elements, wherein the at least one switching arrangement generates an alternating current output signal with a plurality of output voltage levels in response to a plurality of control signals applied to the first plurality of switching elements and the second plurality of switching elements.

2. The converter unit as claimed in claim 1, wherein the multi-level inverter is configured to generate a substantially sinusoidal voltage signal of a predetermined frequency from the output of the first switching stage.

3. The converter unit of claim 1, the at least one switching arrangement further comprising a plurality of switching arrangements configured to generate a multi-phase output signal wherein each switching arrangement in the plurality of switching arrangements generates a single phase in the multi-phase output signal.

4. The converter unit of claim 1, the at least one switching arrangement further comprising a first switching arrangement, a second switching arrangement, and a third switching arrangement configured to generate a three-phase output signal wherein each switching arrangement generates a single phase in the three-phase output signal.

5. The converter unit of claim 1 wherein a first switching element in the first plurality of switching elements is switched off concurrently to a corresponding second switching element in the second plurality of switching elements being switched on.

6. The converter unit of claim 5 wherein the second switching element in the second plurality of switching elements is switched off concurrently to the corresponding first switching element in the first plurality of switching elements being switched on.

7. The converter unit of claim 1 wherein a number of individual voltage output levels in the output signal from the output of the multi-level inverter corresponds to a number of battery modules in the plurality of battery modules.

* * * * *